Dec. 27, 1966     R. C. LAUTERWASSER     3,293,951

BORING AND FACING ATTACHMENT

Filed Sept. 24, 1965

INVENTOR

Robert C. Lauterwasser

United States Patent Office 3,293,951
Patented Dec. 27, 1966

3,293,951
BORING AND FACING ATTACHMENT
Robert C. Lauterwasser, 5005 Rolling Meadows Road, Rolling Hills Estates, Calif. 90274
Filed Sept. 24, 1965, Ser. No. 490,048
5 Claims. (Cl. 77—4)

This invention relates to improvements in a boring and milling machine attachment and more particularly to an attachment which is fastened to both the quill and arbor of the basic machine.

The attachment now on the market requires close machining tolerances, heat treatment of parts and a difficult assembly operation to produce a satisfactory unit.

It is therefore the object of the present invention to provide an attachment whose component parts may be machined to liberal tolerances and still function satisfactorily.

Another object of the present invention is to provide an attachment whose component parts will not require heat treatment.

A further object of the present invention is to provide an attachment whose component parts may be assembled together as a sub-assembly which may easily be assembled with other components to produce the complete unit.

These and other objects of the invention not specifically set forth above will become readily apparent from the accompanying description and drawings, in which.

Figure 1:
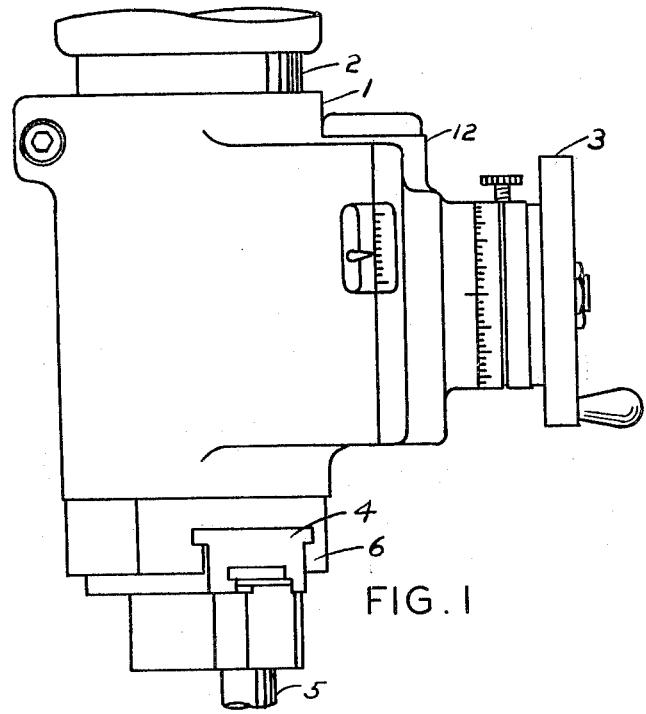
FIG. 1 is an elevational view of the exterior of the attachment as now sold on the market.

Referring to the drawings, the attachment as shown in FIG. 1 presently consists of a housing 1 which is attached to the quill 2 of a boring or milling machine. When handwheel 3 is turned, the slide 4 moves radially inward or outward carrying boring bar 5, both when the head 6 is stationary or rotating relative to housing 1. Head 6 is rigidly fastened to shaft 7 (see FIG. 2) which in turn is secured to the arbor of the boring or milling machine and turns with the arbor.

The movement of the slide 4 is presently accomplished thru a gear train consisting of a rack fastened to slide 4, two spur gears mounted in shaft 7 and a rack fastened to collar 8. When collar 8, which rotates with shaft 7, is moved up or down on shaft 7 the slide 4 will move radially inward or outward. Bearing 9 permits the movement of collar 8 up or down by means of holder 10 which can move vertically up or down but does not rotate. Holder 10 is fastened to slide 11 which is restricted to an up and down movement in grooves formed between the housing 1 and end cap 12.

The attachment as presently sold has the jack screw 13 passing thru threads cut in the slide 11. As slide 11 is made of cast iron, the threads of jack screw 13 must be heat treated to give adequate life.

The jack screw 13 is presently cantilever mounted with both bearing 14 and bearing 15 being mounted in the top end of end cap 12. Bevel gear 16 is axially retained between the threads of jack shaft 13 and the inner race of bearing 14 with no provision made for the adjustment of the mesh of bevel gear 16 with bevel gear 17. Bevel gear 17 is mounted on shaft 18 which turns in bearings 19 and 20 when handwheel 13 is rotated. No provision is made for the adjustment of the position of bevel gear 17 relative to bevel gear 16.

All of the foregoing description applies to the boring and facing attachment now on the market. Due to the lack of adjustments the housing 1, slide 11, end cap 12 and jack screw 13 must be produced to very close tolerances in order to function properly, It is necessary to thread jack screw 13 thru slide 11, gear 16 and bearing 14 after the cover 12 is attached to housing 1. Cover 12 must be in two pieces so that gear 17 may be installed after gear 16 is in place.

The improvements to the boring and facing attachment are as follows:

Drive nut 21 is separate from slide 11 and is made of a material such as oil impregnated bronze which eliminates the requirement of heat treating jack screw 13. Drive nut 21 is a close slide fit to slide 11 at surfaces 22, 23, 24 and 25 but is free to move towards or away from slide 11. Surfaces 22 and 23 transmit the up and down movement of the drive nut 21 to the slide 11. Surfaces 24 and 25 prevent rotation of the drive nut 21 relative to the slide 11 so that rotation of jack screw 13 will cause a vertical movement of drive nut 21.

Bevel gear 16 is axially retained on jack screw 13 by means of a tapered retaining ring 26. The meshing of bevel gear 16 with bevel gear 17 may be adjusted by means of nut 27 and nut 28. The correct axial position of bevel gear 17 relative to bevel gear 16 is obtained by means of shim 29. The axial location of handwheel 3 relative to end cap 12 is obtained by means of shim 30. The desired clearance between the slide 11 and the housing 1 and end cap 12 is obtained by means of shim 31.

Figure 3:
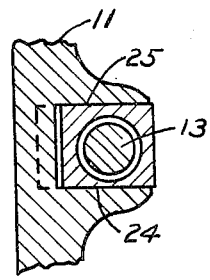
FIG. 3 is a partial cross section taken on line 2—2 of FIG. 2.
Figure 2:
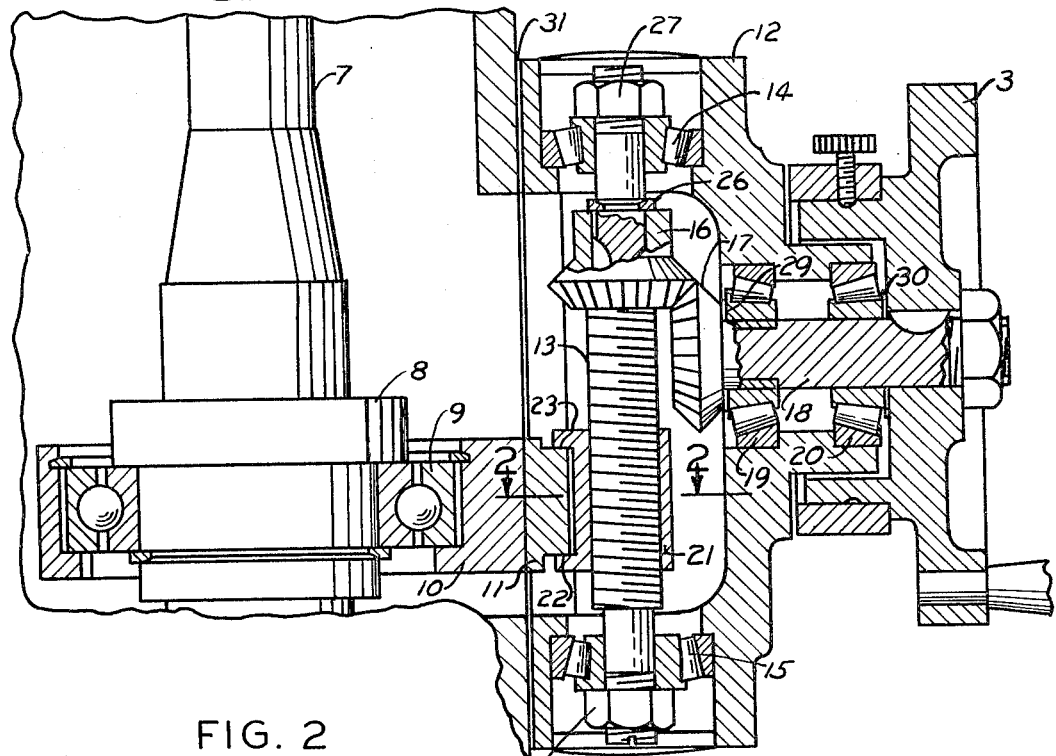
FIG. 2 is a central sectional view of the portion of the attachment affected by this invention.

It can be seen that with drive nut 21 shaped as shown in FIG. 2 and FIG. 3 that all of the components to the right of shim 31, with the exception of slide 11, can be assembled and adjusted as a sub-assembly. The sub-assembly is then mounted on housing 1 with the drive nut 21 engaging the slide 11 as shown.

The preferred mounting of jack screw 13 is as shown with bearing 14 and bearing 15 on opposite ends of jack screw 13. The benefits of using drive nut 21 still exist if the jack screw 13 is cantilever mounted by placing both bearing 14 and bearing 15 at one end of the end cap 12, however the adjustment feature for bevel gear 16 would be lost.

What I claim is:

1. A boring and facing attachment improvement comprising a slide with a separate drive nut mounted on a jack screw with said drive nut free to move relative to said slide in one plane but restrained axially and rotationally by said slide and with said jack screw mounted between bearings in a manner which permits axial adjustment of a bevel gear mounted on said jack screw relative to another bevel gear mounted in an end cap into which all of the components associated with said jack screw may be assembled prior to attachment of said end cap onto the attachment housing.

2. The boring and facing attachment of claim 1 wherein the bevel gear mounted on the jack shaft is axially restrained by means of a tapered retaining ring.

3. The boring and facing attachment of claim 1 wherein the drive nut is made of oil impregnated bronze thus eliminating the heat treatment of the jack screw.

4. A boring and facing attachment improvement comprising a slide with a separate drive nut mounted on a jack screw with said drive nut free to move relative to said slide in one plane but restricted axially and rotationally by said slide and with said jack screw cantilever mounted in bearings in an end cap into which all of the components associated with said jack screw may be assembled prior to attachment of said end cap onto the attachment housing.

5. The boring and facing attachment of claim 4 wherein the drive nut is made of an oil impregnated bronze thus eliminating the heat treatment of the jack screw.

References Cited by the Examiner
UNITED STATES PATENTS

| | | |
|---|---|---|
| 1,249,642 | 12/1917 | Lindfors. |
| 2,367,555 | 1/1945 | Arney. |
| 2,404,433 | 7/1946 | Christman. |

WILLIAM W. DYER, Jr., *Primary Examiner.*